Dec. 13, 1960     H. E. MUELLER     2,963,797
EDUCATIONAL DEVICE
Filed March 5, 1959
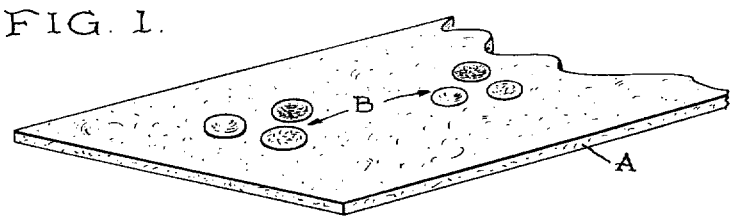
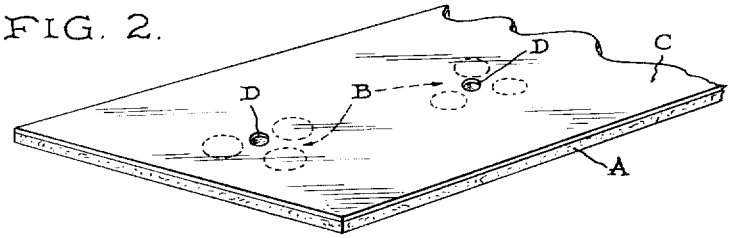
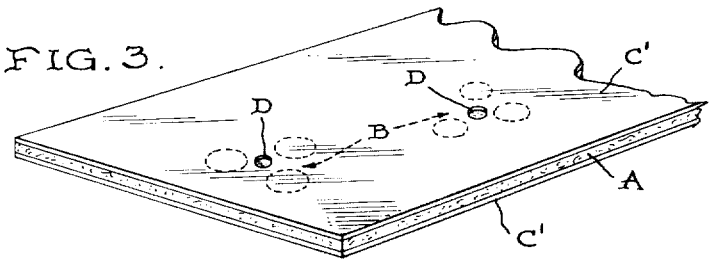
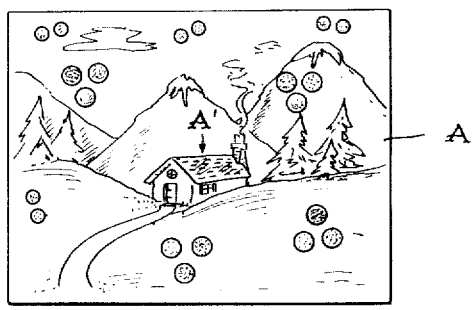
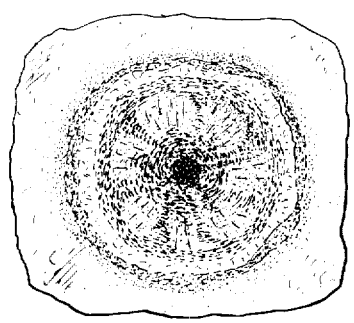
INVENTOR
HARRY E. MUELLER
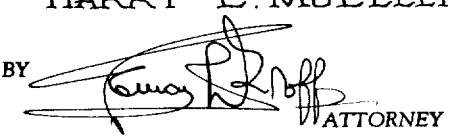
BY
ATTORNEY 2,963,797
Patented Dec. 13, 1960

United States Patent Office

2,963,797
EDUCATIONAL DEVICE

Harry E. Mueller, 604 N. Hamilton, Salem, Ill.

Filed Mar. 5, 1959, Ser. No. 797,494

6 Claims. (Cl. 35—26)

This invention relates to educational and amusement devices and has particular reference to advancing the teaching of and increasing the interest in the science of chromatography and the art of color analysis.

Heretofore, it has been customary to provide children with books having printed picture outlines to be filled in either with crayons or by oil or water colors after a given pattern. In other words, books or individual pictures have been printed with outlines or designs of the selected subject and the various areas of these subjects are colored according to directions usually accompanying the picture.

One of the objects of this invention is to provide a method and means for special guidance in the use of soluble coloring material to produce a more or less unexpected and uncontrolled result which not only increases the interest as to what may be formed, but at the same time through mixing or blending of the colors directs the student's attention to what colors are necessary to obtain certain hues or shades. In that connection, while a printed pattern might be used, such pattern is only incidental. Moreover, the invention enhances the value of teaching color analysis, or composition by the separation of the colors. For example, not many people know that brown contains blue, and that black may be made up of many colors.

Another object of the invention is to provide an article of manufacture in the nature of a fibrous sheet having avidity for solvent fluids and capable of deploying them in relatively uncontrolled patterns. In other words, with respect to any given color, there is no barrier between it and an adjacent color for the intended purpose of blending which may be surprising in the sense that it is unexpected.

A further object of the invention is to provide an article of manufacture comprising an absorbent sheet having an impervious cover provided with an opening or openings related to dots or spots of soluble coloring material. The solvent material may be placed into the opening by dropping the same therein or by even using a brush as a dropper to start the dyes in solution.

A still further object of the invention is to provide an article of manufacture wherein the density or intensity of dyes put in the solution may be controlled by the amount of water supplied to the absorbent carrier sheet for the dyes, thereby enabling an instructor, for example, to direct a student in the art of providing shades and hues of the primary or basic color.

A further object is to provide an article of manufacture in the nature of a fibrous sheet with designs, or pictures, completely or partially concealed within a spot of color, the design or picture becoming evident only upon the application of the solvent, for example a rabbit completely concealed in a black spot and only seen when the solvent is applied.

With the above and other objects in view which will appear as the nature of the invention is better understood, the invention consists in the novel construction, combination, and arrangement of parts, hereinafter disclosed and the method of using the same.

In the accompanying drawings:

Figure 1 is a fragmentary perspective view of a fibrous sheet having applied to the surface thereon spots or dots of any given colors, such, for example, as the primary colors, red, blue and yellow.

Figure 2 is a perspective view of the basic color carrier shown in Figure 1 having an impervious sheet applied thereto, said sheet having an opening in the zone of a color or group of colors.

Figure 3 is a perspective view of a further modification wherein both sides of the basic soluble dye-carrying sheet are provided with the plastic cover.

Figure 4 is a diagrammatic plan view of a sheet having the background design printed thereon and surrounded by dots and spots of soluble coloring dyes, the said sheet being with or without the plastic covering sheet.

Figure 5 is a fragmentary detail plan view illustrating the result of feeding droplets or special limited amounts of solvent to the dyes on the carrier sheet.

Similar reference characters designate corresponding parts throughout the several figures of the drawings.

Referring first to Figure 1, it will be seen that an absorbent sheet is the primary dye-carrying sheet such as A and is provided with a series of color dots designated generally as B. These dots may be impressed on the surface of the sheet A in any order or arrangement and by any well known and appropriate manner, and their arrangement may be in groups as shown, or even in linear relationship if desired. The spots or dots B may be of colors which may be rendered soluble by the application of water, or if the nature of the dots is such that a chemical solvent is desired, it will, of course, be understood that this is also within the scope of the invention.

By applying the solvent to a dot or a group of dots, the dyes will dissolve and deploy radially outward more or less after the fashion of ripples in a pond, resulting from a stone being thrown therein. In other words, once the solution is applied, it is free to move in the fibers of the sheet and without restraint in any direction. By regulating the amount of solvent, the concentration of the dyes may be controlled, or to state the matter another way, the more solvent applied, the greater the dilution to obtain shades and hues of a pastel nature.

Referring to Figure 2, it will be seen that the primary dye-carrying fibrous sheet A is provided with a covering C having an opening or openings D for permitting the entrance of the solvent into the sheet in the zone of the soluble dyes D.

Figure 3 illustrates a further modification of the invention where both sides of the absorbent sheet A may be provided with plastic or other impervious coating C'. If desired, only one of the sheets C' may have openings D although it will, of course, be understood that both sheets may be provided with openings and that both sides of the carrier sheet A may be provided with spots or dots of dyes D in any arrangement or of any color selection, thereby further increasing the interest in the range of use of the present invention.

Figure 4 illustrates that the dye-carrier sheet A may have a design imprinted thereon. However, it will be understood that this design is only incidental and presents no barriers to the creeping or spreading of the dyes as they are dissolved.

In fact, the dyes themselves may be used to form the pattern or picture in cases where the object selected for the picture would afford educational or amusement qualities to the user.

Figure 5 shows how the dyes comprising the dots when provided with solvents fade off into hues and shades lighter than the primary color itself.

It may also be pointed out that dyes of different colors may be superimposed on one another in the area of a single dot in order to provide not only a dominant color but combinations of a certain color. Moreover, in the technique of practicing the invention, it will be understood that successive drops of water may be placed at the center or axis of the dye impregnated area to give wider range to the ultimate circumference of the area to be colored. Also by following the procedure of letting the dyed image dry and subsequently returning to it with additional drops of water, an additional wide range of color effects can be obtained.

From the foregoing it will be understood that the present invention is not inhibited by barriers between different colors, it being the intention that the subject invention be used for deployment, or otherwise mixing of the colors to result in mottled or other effects which are within the skill of the user.

I claim:

1. An article of manufacture for educational or amusement purposes, comprising, a fibrous sheet having avidity for a solvent, soluble dried dyes arranged in a selected pattern on said sheet, a solvent impervious coating on said sheet having an opening adjacent said dyes, and means for applying a solvent to said sheet through said opening to dissolve the dyes and form a promiscuous uncontrolled pattern having a range of area and density of color values in proportion to the amount of solvent passed through the opening.

2. An article of manufacture for educational or amusement purposes, comprising, a fibrous sheet having avidity for a solvent, soluble dried dyes arranged in groups on said sheet, a solvent impervious coating on said sheet having an access opening for each group of said dyes and means for applying a solvent to said sheet through said opening to dissolve the dyes and form a promiscuous uncontrolled pattern having a range of area and density of color values in proportion to the amount of solvent passed through the opening.

3. An article of manufacture for educational and amusement purposes, comprising, in combination, a relatively soft textured liquid penetrable fibrous sheet having the capacity to absorb and radially deploy liquid laterally and vertically in the body of the sheet when said liquid is applied to a surface thereof, and separate areas of liquid soluble dyes visible on said surface of the sheet serving to direct the user where to apply increments of a dissolving liquid thereby to form on the sheet a promiscuous uncontrolled deployment of diluted dye throughout at least a portion of the body and surface area of the sheet.

4. An article of manufacture for educational and amusement purposes, comprising, in combination a fibrous sheet having avid capacity for the progressive absorption and radial deployment by capillary attraction of drops of liquid, and areas of colored dyes exposed on the surface of the sheet and adapted to dissolve under the influence of said liquid to penetrate the surface and body of the sheet to spread radially from the point where the dissolving liquid is dropped to provide patterns of color in promiscous uncontrolled radial deployment of progressively diminishing color throughout the body and face of the sheet and to blend with each other to form shades and hues of more or less fantastic pattern.

5. An article of manufacture according to claim 4, wherein the areas of dyes are placed near each other.

6. An article of manufacture according to claim 4, wherein, the dye areas consist of a group of separate dye colors, said groups arranged in spaced relation on the surface of the sheet, whereby, water dropped in a plain area between the location of the dyes would dissolve said dyes in varying degrees in proportion to the amount of solvent dropped on the sheet.

References Cited in the file of this patent

UNITED STATES PATENTS

| | | |
|---|---|---|
| 1,410,344 | Ornstein | Mar. 21, 1922 |
| 1,824,598 | Holder | Sept. 22, 1931 |
| 1,950,649 | Bauer | Mar. 13, 1934 |